May 18, 1965  D. L. MORGAN  3,183,672
PRESSURE RESPONSIVE DEVICE WITH OVERPRESSURE PROTECTION
Filed June 3, 1964  2 Sheets-Sheet 1

INVENTOR
David L. Morgan
BY Arnold and Roylance
ATTORNEY

May 18, 1965  D. L. MORGAN  3,183,672
PRESSURE RESPONSIVE DEVICE WITH OVERPRESSURE PROTECTION
Filed June 3, 1964  2 Sheets-Sheet 2

ACTUATOR MEMBER DISPLACEMENT (INCHES)

BELLOWS DISPLACEMENT (INCHES)

PRESS. CHAMBER (#/in²)

PRESSURE—ENCLOSURE (#/in²)

INVENTOR
David L. Morgan
BY Arnold and Roylance
ATTORNEY

United States Patent Office 3,183,672
Patented May 18, 1965

3,183,672
PRESSURE RESPONSIVE DEVICE WITH
OVERPRESSURE PROTECTION
David L. Morgan, Shelton, Conn., assignor to Robertshaw
Controls Company, Richmond, Va., a corporation of
Delaware
Filed June 3, 1964, Ser. No. 372,201
14 Claims. (Cl. 60—54.5)

This invention relates generally to pressure responsive devices for displacing an actuator element in response to pressure applied to a flexible wall member. More particularly, this invention is concerned with protection of the flexible wall member when the applied pressure exceeds a predetermined value which would normally damage the member.

Pressure responsive devices which include a flexible wall member, usually in the form of a diaphragm or bellows, are widely used in pressure responsive instruments and controls. Essentially, devices of this type are so constructed that pressure applied to the bellows displaces a portion of the bellows which in turn displaces an actuator element, via a mechanical or fluid coupling between them.

In many pressure responsive systems for example, in the conventional pressure thermometer, the pressure applied to the bellows is from a gas contained in a closed system formed in part by the bellows. The bellows must then be constructed of metal, or other gas impervious material. Otherwise, a portion of the gas escapes; the instrument is no longer accurate.

As is well known to those skilled in this art, flexible wall members of metal, especially of the bellows type, present several problems. The bellows must normally deflect linearly in response to different values of applied pressure and such deflection must be within the elastic limit of the bellows, since any permanent deformation of the bellows due to excessive pressure and deflection renders the bellows useless. Hence, the bellows must be made strong enough to withstand relatively high pressures to avoid destruction. However, for the bellows to be reasonably sensitive at low pressure, the wall portions of the bellows must be relatively thin. Hence, it is quite difficult to produce a pressure responsive device with a bellows or other flexible wall member that is both sensitive at low pressures and that will not be damaged due to unpredicted high pressure. These factors, coupled with the permissible maximum selling price of such units in this highly competitive industry, show a distinct need for a mass produced reliable pressure responsive actuator that is sensitive and that is not damaged by pressure many times greater than the normal working pressure of the unit.

This invention provides a pressure responsive device with the aforestated advantages. The basic idea of the overpressure protection feature is to support the side of a bellows opposite that side which is acted on by the applied pressure. Although it is well known to limit the extent of deflection of a bellows with a rigid stop or other mechanical means, such devices provide support for only a portion of the wall of the bellows, and the remaining wall portions are frequently damaged or destroyed by a substantial excess of applied pressure.

The unique overpressure protection arrangement of this invention is effective to create a pressure balance which opposes the forces of the applied pressure but only when the applied pressure exceeds a predetermined value that would normally damage the bellows.

To accomplish this pressure balance a second flexible wall member in the form of a flexible diaphragm cooperates with the bellows to define a fluid filled enclosure. The fluid in this enclosure is preferably a liquid so that the volume of liquid displaced by movement of the bellows is accommodated by movement of the diaphragm. The extent of displacement of the diaphragm beyond a predetermined maximum is prevented by the cooperating wall portions of the housing and an actuator movable relative to the housing. The movement of the actuator is limited so that the diaphragm cannot be displaced to accommodate more than a predetermined volume of liquid.

During normal pressure operation the bellows displaces the liquid which is accommodated by the diaphragm, the bellows and diaphragm also being effective to move the actuator. When maximum operating pressure is encountered the actuator is moved to its limit and the diaphragm simultaneously is displaced to its maximum extent. Further pressure increase tends to further deform the bellows to displace more liquid. However, since the enclosure cannot accommodate more liquid the pressure of the liquid in the enclosure increases until it equals the applied pressure. With the pressure on each side of the bellows equal there are no forces which can damage the bellows. Hence the maximum pressure that the pressure responsive actuator can withstand depends on the maximum bursting strength of the wall portions of the housing which confine the diaphragm or on the maximum bursting strength of the diaphragm itself, whichever is greater.

With this arrangement the bellows may be quite delicate so slight changes in pressure will deform the bellows to displace the actuator. When the applied pressure exceeds the maximum working limit the pressure balance is created to protect even a very delicate bellows. The only effect of much higher applied pressure is to exert additional pressure on the liquid in the enclosure which merely increases the pressure in the enclosure to a value equal to such higher pressure.

Therefore, an object of this invention is to provide an improved overpressure protection arrangement for a pressure responsive device which has a flexible wall member.

Another object of this invention is to provide an improved pressure responsive device which automatically balances the pressure on both sides of a flexible wall member which is exposed to applied pressure.

A further object of the present invention is to provide an overpressure protection device for the flexible wall member of a pressure responsive device in the form of a closed fluid-filled chamber to limit the volume of fluid that can be displaced by the flexible wall member.

A further object is to provide an overpressure protection arrangement for a pressure responsive device which creates a pressure balance to support all the wall portions of the flexible wall member of a pressure responsive device.

A further object of this invention is an overprotection arrangement for a flexible metal bellows which displaces an actuating element linearly at normal working pressures and which is prevented from excessive displacement by limiting the displacement of the actuator element.

A still further and very important object is to provide a pressure responsive device which satisfies the above objects and which can be mass produced economically.

The following specification, of which the accompanying drawings form a part, explains the manner in which the foregoing objects are attained in accordance with this invention. In the drawings.

Figure 3:
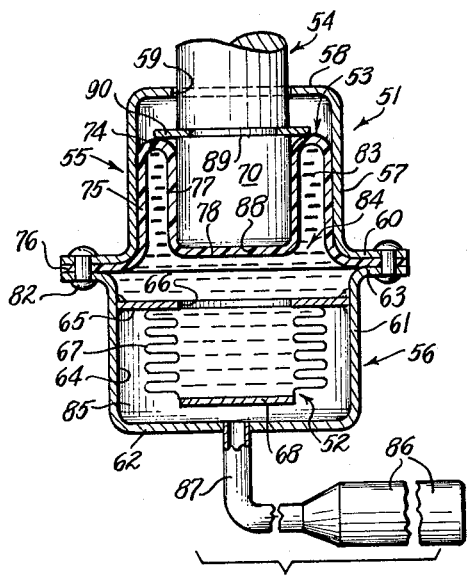
Figure 4:
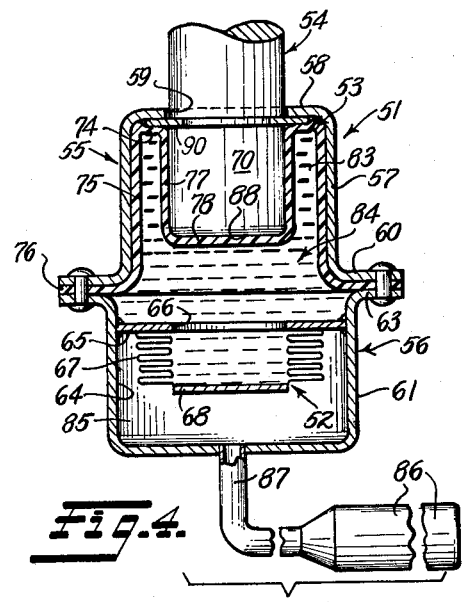
Figure 5:
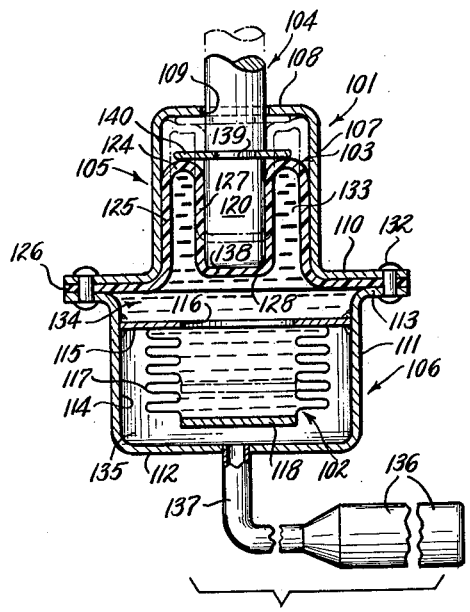
Figure 6:
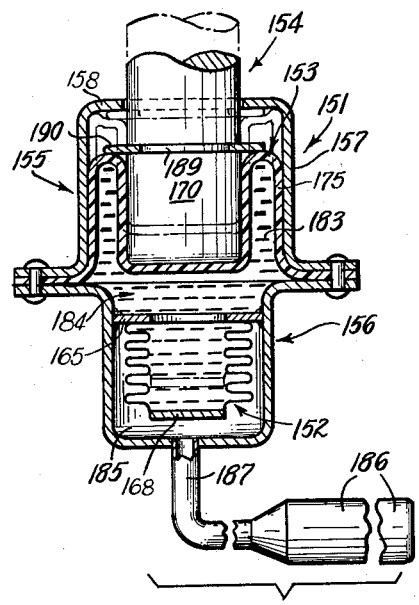
Figure 7:
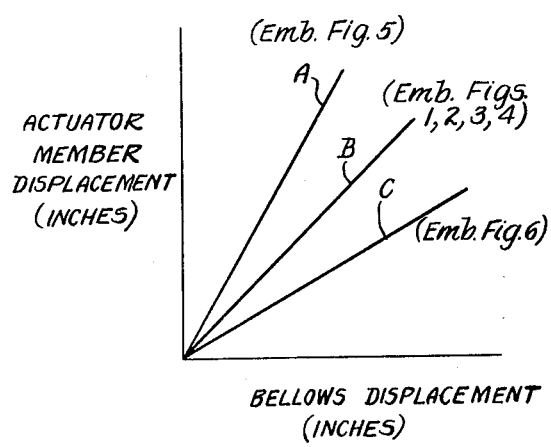
Figure 8:
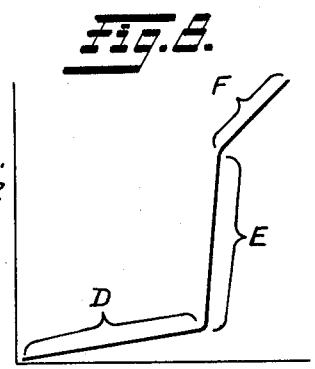

FIG. 3 is a sectional view of a second embodiment of the pressure responsive device showing the positions of the various elements at normal working pressures;

FIG. 4 is a sectional view of the embodiment of FIG. 3 showing the position of the various elements when overpressure is encountered;

FIG. 5 is a sectional view of a third embodiment of the pressure responsive device in the form of a motion multiplier showing the positions of the various elements at normal working pressures in solid line, and the positions of the various elements when overpressure is encountered in broken lines;

FIG. 6 is a sectional view of a fourth embodiment of the pressure responsive device in the form of a force multiplier, showing the positions of the various elements at normal working pressure in solid lines, and the positions of the various elements when overpressure is encountered in broken lines;

FIG. 7 is a graphical representation of bellows displacement versus actuator member displacement; and FIG. 8 is a graphical representation of the pressures acting on each side of the bellows.

Figure 1:
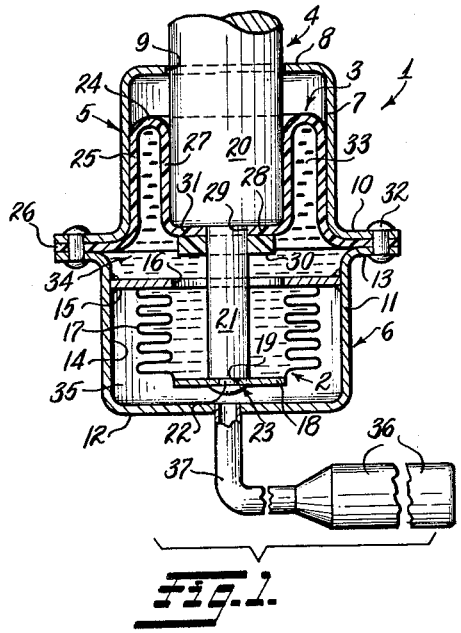
FIG. 1 is a sectional view of one embodiment of the pressure responsive device showing the positions of the various elements at normal working pressure.
Figure 2:
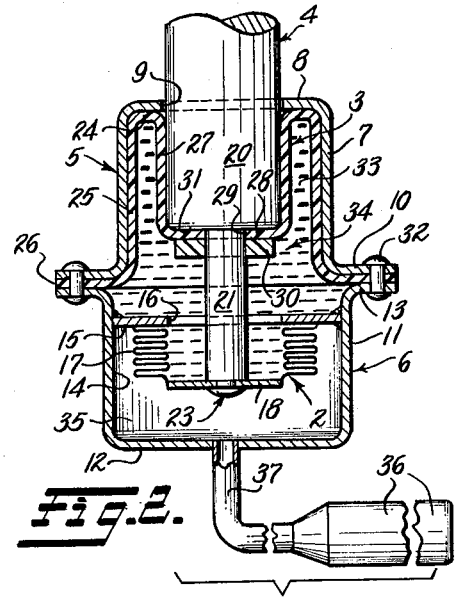
FIG. 2 is a sectional view of the embodiment of FIG. 1 showing the positions of the various elements when overpressure is encountered.

To simplify understanding of the relationship between similar elements of the various embodiments the following system of numerals is used:

Numerals 1–50 identify parts of the embodiment of FIGS. 1 and 2.

Numerals 50–100 identify parts of the embodiment of FIGS. 3 and 4.

Numerals 100–150 identify parts of the embodiment of FIG. 5.

Numerals 150–200 identify parts of the embodiment of FIG. 6.

The elements of the different embodiments are numbered with the numeral that results from adding 50 to the similar element of a preceding embodiment i.e. the "bellows" is identified by numeral 2 in FIGS. 1 and 2; numeral 52 in FIGS. 3 and 4; numeral 102 in FIG. 5; numeral 152 in FIG. 6.

Referring now to the drawings in detail and in particular to FIGS. 1 and 2, a pressure responsive device 1 is seen to include a first flexible wall member in the form of a bellows 2 a second flexible wall member in the form of a diaphragm 3, and an actuator member 4 disposed in a housing comprised of connected cup-shaped members 5 and 6.

Cup 5 is preferably of stamped sheet metal and includes a circular side wall 7 having an integral end wall 8 provided with a circular opening 9 concentric with wall 7. At its other end side wall 7 has an integral radially outwardly projecting flange 10.

Cup 6 is also stamped from sheet material and includes a circular side wall 11, a flat end wall 12 integral with one end of the side wall, and a radially outwardly projecting flange 13 integral with the other end of the side wall. Sealed by welding or soldering to the inner surface 14 of circular side wall 11 at a point slightly spaced axially from flange 13 is a flat annular metal member 15 having a central opening 16, member 15 having an outer peripheral diameter substantially the same as the inside diameter of side wall 11.

Bellows 2 is circular in section and has a conventional corrugated side wall 17 formed of metal having spring properties, and a flat circular metal end 18 sealed to one end of the side wall, end 18 having a central bore 19. The other end of the side wall presents a flat annular surface that is sealed to annular member 15 by welding or soldering.

Actuator member 4 has a cylindrical body 20 and a cylindrical end 21 of smaller diameter than body 20 projecting axially therefrom. A tip 22 of smaller diameter than end 21 projects through opening 19 in bellows 2 and is mechanically deformed as at 23 to seal opening 19 and to secure the bellows to the actuator member. Body 20 has a diameter only slightly smaller than the diameter of opening 9 of cup 5 so the actuator can move relative to the cup while maintaining the opening 9 substantially closed. The diameter of body 20 is substantially smaller than the inside diameter of cup 5 measured across side wall 7.

Diaphragm 3 is formed from flexible material which may be somewhat resilient. Diaphragm 3 may be molded or otherwise formed to the general configuration of FIG. 1 wherein it is seen that the diaphragm is of essentially uniform wall thickness and includes a central cup-shaped portion having an outwardly turned top edge 24 and a downwardly extending outer side wall 25 of circular cross section which terminates at a radially outwardly extending flange 26 slightly below the bottom of the cup of the diaphragm, flange 26 being disposed between flanges 10 and 13 respectively of cups 5 and 6. The cup-shaped portion of diaphragm 3 includes an inner side wall 27 extending perpendicular to the plane of a flat end wall 28, side wall 27 and end wall 28 being dimensioned to receive body 20 of actuator member 4. End wall 28 has a central opening 29 through which end 21 of actuator member 4 extends, the side edge of opening 29 snugly engaging the cylindrical surface of end 21. A resilient washer 30 frictionally engages end 21 to maintain end wall 28 in engagement with a transverse annular end face 31 of actuator member 4. As shown in FIG. 1, the various portions of diaphragm 3 are integral and both inner side wall 27 and outer side wall 25 are concentric with body 20 of actuator 4. Flange 26 of diaphragm 3 functions as a seal when flanges 10 and 13 are fastened with a plurality of rivets 32 with the diaphragm flange therebetween.

As seen in FIG. 1 a sealed enclosure 33 is defined by bellows 2, annular member 15, a short portion of side wall 11, adjacent flange 13, and diaphragm 3. Enclosure 33 is filled with a liquid or other fluid 34 that is essentially incompressible at the maximum overpressure that may be encountered. The material of the diaphragm is impervious to fluid 34.

There is also a chamber 35 defined by bellows 2, annular member 15, and the side and end walls of cup 6, the chamber communicating with a pressure bulb 36 via a tube 37 connected between cup 6 and the bulb. The bulb, tube, and chamber form a closed system which contains a gas or other fluid the pressure of which changes due to a change of condition at the bulb, for example, a change in temperature. As the temperature of the gas changes the pressure in chamber 35 changes and bellows 2 is distorted thereby moving actuator 4. To provide for linear response of the actuator in response to the deformation of the bellows it is to be particularly noted that the diameter of bellows 2 as measured to the outermost portion of the corrugations is identical to the diameter measured across the inner surface of outer side wall 25 of the diaphragm.

Since these diameters are the same it correspondingly follows that the effective area of diaphragm 3 measured in a direction perpendicular to the path of travel of actuator member 4 (and centrally located end wall 28) is the same as the effective area of bellows 2 measured in a direction perpendicular to the path of travel of flat end 18. Hence, an increment of distortion of bellows 2 by pressure in chamber 35 causes the same increment of distortion of diaphragm 3, because of the action of incompressible fluid 34, and because of the mechanical fastening between actuator member 4 and belows 2 at tip 22. It is thus apparent that the decrease in volume of the bellows, when compressed, is exactly equal to the increase in volume of the diaphragm because of the action of fluid 34. Fluid 34 is of low viscosity to insure rapid displacement by the bellows.

FIG. 1 shows the various elements of the pressure responsive device when there is normal working pressure in chamber 35. FIG. 2 shows the position of the various elements of the pressure responsive device when the pressure in chamber 35 exceeds the normal working pressure. As seen in FIG. 2, bellows 2 is substantially compressed and actuator 4 has moved a sufficient distance to permit diaphragm 3 to be forced into engagement with end wall 8 of cup 5 by fluid 34. In this position diaphragm 3 is completely supported by the inner surfaces of the wall portions of cup 5 and the outer surface of body 20 that extends into the cup.

By virtue of the connection at 23 between bellows 2 and actuator member 4, movement of the actuator member beyond the FIG. 2 position is effectively prevented. For reasons that will subsequently be set forth in detail, the effect of a further increase in pressure in chamber 35 is to increase the pressure of incompressible fluid 34 until the pressure in enclosure 33 equals that in chamber 35. This effect is very important since the pressure on each side of bellows 2 is then approximately the same, and damage to the bellows is prevented by virtue of this "pressure balance." Hence, even a very delicate bellows will not be damaged by substantial overpressure in chamber 35 since it is the pressure differential across the bellows that causes the damages. Therefore, the maximum working pressure which pressure responsive actuator 1 can withstand depends on the maximum rupture strength of cup 6 or on the maximum rupture strength of diaphragm 3. If the diaphragm is stronger cup 6 will fail first, and if cup 6 is stronger both will fail at the same time since the walls of the cup support the diaphragm, either form of failure rendering the pressure responsive actuator useless.

Turning now to the embodiment of FIGS. 3 and 4 there is shown another pressure responsive device 51 which includes a first flexible wall member in the form of a bellows 52, a second flexible wall member in the form of a diaphragm 53, and an actuator member 54 disposed in a housing comprised of connected cup-shaped members 55 and 56. Cup 55 is identical to cup 5 and includes a circular side wall 57 having an integral end wall 58 provided with a circular opening 59. Cup 55 also has an integral radially outwardly projecting flange 60. Cup 56 is identical to cup 6 of the FIG. 1 embodiment and includes a circular side wall 61, a flat end wall 62 integral with one end of the side wall, and a radially outwardly projecting flange 63 integral with the other end of the side wall. Sealed by welding or soldering, to the inner surface 64 of circular side wall 61, at a point slightly spaced axially from flange 63 is a flat annular metal member 65 having a central opening 66, the member 65 having an outer peripheral diameter substantially the same as the inner surface of side wall 61.

Bellows 52 is circular in outline and has a conventional corrugated side wall 67 of springy metal, and a flat end wall 68 sealed to one end of the side wall. The other end of the side wall presents a flat annular surface that is sealed to annular member 65 by welding or soldering. Actuator member 54 includes a cylindrical body 70 which projects through opening 59 of cup 55. Spaced from flat end face 88 of body 70 is a circumferential groove 89 which retains a split washer 90. Washer 90 is made of spring material to permit expanding the washer to a diameter sufficient to slip the washer over the end of the actuator and snap same into groove 89. The washer has an outer diameter substantially greater than opening 59 to limit movement of the actuator by engagement of washer 90 with the portions of end wall 58 adjacent opening 59.

Diaphragm 53 is formed from flexible material which may be somewhat resilient. Diaphragm 53 may be molded or otherwise formed to the general configuration of FIG. 3 wherein it is seen that the diaphragm is of essentially uniform wall thickness and includes a central cup-shaped portion having an outwardly turned top edge 74 and a downwardly extending outer side wall 75 of circular cross section, which terminates at a radially outwardly extending flange 76 slightly below the bottom of the cup of the diaphragm, flange 76 being disposed between flanges 60 and 63 respectively of cups 55 and 56. The cup-shaped portion of diaphragm 3 includes an inner side wall 77 extending perpendicular to the plane of a flat end wall 78, side wall 77 and end wall 78 being dimensioned to receive body 70 of actuator member 54. End wall 78 is unbroken and is in engagement with end face 88 of body 70 of actuator member 54. As shown in FIG. 3, the various portions of diaphragm 53 are integral and both inner side wall 77 and outer side wall 75 are concentric with body 20 of actuator 54. Flange 76 of diaphragm 53 functions as a seal when flanges 60 and 63 are fastened with a plurality of rivets 82 with the diaphragm flange therebetween. As seen in FIG. 3 a sealed enclosure 83 is defined by bellows 52, annular member 65, a short portion of side wall 61 adjacent flange 63, and diaphragm 53. Enclosure 83 is filled with a liquid or other incompressible fluid 84, the material of the various elements defining enclosure 83 being impervious to fluid 84.

There is also a chamber 85 defined by bellows 52, annular member 65, and the side and end wall of cup 56, the chamber communicating with a pressure bulb 86 via a tube 87 connected between cup 56 and the bulb. Bulb 86, tube 87, and chamber 85, form a closed system containing a gas or other fluid the pressure of which changes due to a change of condition at the bulb. The material of the various elements defining this closed system is impervious to the fluid contained therein. It is to be noted that the embodiment of FIGS. 3 and 4 is quite similar to the embodiment of FIGS. 1 and 2 save that the former does not have a direct mechanical connection between actuator member 54 and bellows 52, (FIGS. 3 and 4) whereas actuator member 4 (FIGS. 1 and 2) is connected to bellows 2 at 23. The only other difference is that the FIGS. 3 and 4 embodiment has washer 73 and groove 72 which coact to provide means for limiting the motion of actuator 54 in a direction out of cup 55.

Pressure responsive actuator 51 is linearly responsive. Pressure in chamber 85 distorts bellows 52 axially. Such distortion displaces incompressible fluid 84. Diaphragm 53 is distorted by the displaced fluid, and hence, it is apparent that the volume of fluid displaced by bellows 52 is accommodated by diaphragm 53. It is to be particularly noted that the diameter of diaphragm 53 measured across the inner surface of outer side wall 75 is equal to the maximum inside diameter of corrugated wall 67 of bellows 52. It therefore follows that the effective area of diaphragm 53 measured in a direction perpendicular to its direction of distortion is equal to the effective area of bellows 52 measured in a direction perpendicular to its direction of distortion, i.e., the path of movement of end wall 68. Therefore pressure in chamber 85 sufficient to distort bellows 52 a certain distance will likewise distort diaphragm 53 an identical distance.

FIG. 4 shows the position of the various elements of pressure actuator 51 when a pressure above a predetermined maximum occurs in chamber 85. Such predetermined maximum pressure is usually although not necessarily that pressure above which damage to the bellows would occur. As shown in FIG. 4, washer 90 engages the inner surface of end wall 58 to prevent further motion of actuator 4 in a direction out of cup 55. As is apparent from FIG. 4, the various portions of diaphragm 53 are completely supported by the combined retaining wall effect of the surface of body 70, the edge of washer 90, and the inner surface of cup 55. When this condition is reached, further increases in pressure chamber 85 have essentially no effect on bellows 52. Such pressure increases merely increase the pressure of fluid 84 to provide a pressure balance wherein the pressure of fluid 84 equals that of the working fluid in chamber 85. Due to such equalization of pressure on each side of bellows 52 there is no danger of damage to the bellows due to over pressure in chamber 85, unless of course, diaphragm 53 ruptures, in which instance the pressure responsive actuator would be useless anyway.

The embodiment of FIG. 5 illustrates the application of the overpressure protection arrangement to a pressure responsive device in the form of a motion multiplier 101. By motion multiplier it is meant that distortion of an axial deformation of the bellows of ¼ inch, for example will result in a substantially larger axial distortion of the diaphragm, for example ½ inch, and correspondingly, larger relative displacement of the actuator member.

Motion multiplier 101 (FIG. 5) is the same as pressure responsive actuator 51 (FIGS. 3 and 4) except that in motion multiplier 101 bellows 102 has a larger effective area than diaphragm 103, whereas in actuator 51 bellows 52 has the same effective area as diaphragm 53. Lower cup 106 is constructed with its side wall 111 of proportionately larger diameter than the diameter of side wall 107 of upper cup 105.

Referring now to FIG. 5 it is apparent that motion multiplier 101 includes a first flexible wall member in the form of a bellows 102, a second flexible wall member in the form of a diaphragm 103 and an actuator member 104 that extends into a housing comprised of connected cup-shaped members 105 and 106. Cup 105 is preferably of stamped sheet metal and includes a circular side wall 107 having an integral end wall 108 provided with a circular opening 109 concentric with wall 107. At its other end, side wall 107 has an integral radially outwardly projecting flange 110. Cup 106 is also stamped from sheet metal and includes a circular side wall 111, a flat end wall 112 integral with one end of the side wall, and a radially outwardly projecting flange 113 integral with the other end of the side wall. Sealed, by welding or soldering to the inner surface 114 of circular side wall 111 at a point slightly axially from flange 113 is a flat annular metal member 115 having a central opening 116, the annular metal member having an outside diameter substantially the same as the inner surface of the side wall 111.

Bellows 102 is circular in section and has a conventional corrugated side wall 117 of springy metal and a flat end 118 sealed to one end of the side wall. The other end of corrugated wall 117 presents a flat annular surface that is sealed to annular member 115 by welding or soldering.

Actuator member 104 has a cylindrical body portion 120 which extends through opening 109 in cup 105. End face 138 of body 120 engages the central portion of diaphragm 103.

Diaphragm 103 is formed from flexible material which may be somewhat resilient. Diaphragm 103 includes a central cup-shaped portion, an outwardly turned upper edge 124 integral with a downwardly depending outer side wall 125 which terminates at a radially outwardly projecting flange 126. The cup-shaped portion of diaphragm 103 includes a straight side wall 127 of circular section integral with a flat end wall 128, the diameter of side wall 127 snugly engaging the side of body portion 120 of actuator 104, with end wall 128 in engagement with end face 138 of body 120.

A groove 139 is provided in body 120 to retain a spring material split washer 140, the groove being located to normally maintain washer 140 spaced from the inner surface of end wall 108 of cup 105.

Bellows 102, diaphragm 103 and portions of cup 106 and annular member 115 combine to provide a sealed enclosure 133 filled with an incompressible fluid 134. On the other side of bellows 102 and annular metal member 115 is a chamber 135 communicating with a pressure bulb 136 via a tube 137. Chamber 135, tube 137 and bulb 136 form a closed fluid filled system. Variations of pressure in this closed system operate to distort bellows 102 thereby displacing fluid 134 to move actuator member 104 via the distortion of diaphragm 103.

Since the effective area of bellows 102 is substantially greater than the effective area of diaphragm 103 a change of pressure in the chamber 135 sufficient to move end wall 118 of the bellows a certain distance will result in a substantially greater distortion of diaphragm 103 and correspondingly, movement of actuator 104 along its path of travel. This result is realized because the volume of fluid 134 displaced by distortion of bellows 102 must be accommodated by distortion of diaphragm 103. In view of the arrangement of the elements of motion multiplier 101 such additional distortion of diaphragm 103 must take place by greater distortion of diaphragm 103 in a direction along the path of travel of actuator member 104, than the distortion of bellows 102 in the same direction.

The overpressure protection concept of motion multiplier 101 is the same as that described for pressure responsive actuator 51. When over pressure is encountered the elements of motion multiplier 101 assume the positions shown in dotted lines in FIG. 5. It is seen, that during overpressure conditions, split washer 140 engages the inner surface of end wall 108, and all portions of diaphragm 103 are completely supported by the retaining wall effect of cup 105, the portion of actuator 104 which extends into the cup, and the surface of washer 140 which faces toward the diaphragm. When so supported further increases in pressure in chamber 135 do not operate to further distort bellows 102 since no more fluid 134 can be displaced by the bellows. Hence, further increases in pressure in chamber 135 merely tend to compress fluid 134, and since this fluid is incompressible the end result is to increase the pressure in chamber 133 until a balance of pressure is reached on each side of the bellows 102. It is to be noted with particularity that the pressure of fluid 134 in chamber 133 operates to support both flat end 118 and side wall 117 of bellows 102 against damage due to excessive pressure in chamber 135. Hence, bellows 102 is protected from radial collapse as well as collapse in an axial direction.

Referring now to FIG. 6 there is shown a pressure responsive device in the form of a force multiplier 151. Force multiplier 151 includes bellows 152, diaphragm 153, actuator member 154, upper cup 155, lower cup 156 and a flat annular metal member 165, all the elements being mounted and arranged in a manner similar to those of the embodiments of FIGS. 3 through 5. The cup-shaped portion of diaphragm 153 engages actuator member 154. A stop washer 190 is disposed in groove 189 of actuator member 154 to limit the motion of the actuator member in a direction out of cup 155. Sealed enclosure 183 is defined by the bellows, diaphragm, and other wall portions of lower cup 156 and flat metal member 165, enclosure 183 being filled with an incompressible fluid 184.

In the FIG. 6 embodiment, the diameter of bellows 152 is substantially smaller than the effective diameter of diaphragm 153 as measured to the inside of outer side wall 175. To accommodate the larger diaphragm upper cup 155 is formed with a diameter greater than the diameter of lower cup 156. A closed fluid filled system is defined by chamber 185, pressure bulb 186, and tube 187 connected between the bulb and the chamber. The FIG. 6 embodiment operates as a force multiplier which could also aptly be termed a motion divider. Since the diameter of bellows 152 is less than the diameter of diaphragm 153 is correspondingly follows that the effective area of the bellows is substantially less than the effective area of the diaphragm. Hence, distortion of bellows 152 by pressure in chamber 185 so that end 168 of the bellows moves, for example, ¼ inch, results in a much smaller distortion of diaphragm 153 so that actuator 154 moves a shorter distance for example ⅛ inch. However, the total force of the fluid acting to distort diaphragm 153 and move actuator 154 is substantially greater than the total force of pressure in chamber 185 acting to distort bellows 152 axially. Therefore, although the total force exerted on the effective area of bellows 152 may be for example one pound the total force exerted on diaphragm 153 and actuator 154 may be two pounds (assuming of course that the effective area of diaphragm 153 is twice the effective area of bellows 152).

When overpressure is encountered actuator member 154 is forced outwardly until stop washer 190, engages the inner surface of end wall 158. Further motion of actuator 154 is then prevented and bellows 152 is correspondingly protected in the same manner as described with regard to the embodiments of FIGS. 3 through 5.

In each of the embodiments of FIGS. 1 through 6 the diameter of the actuator member is somewhat smaller than the diameter of the upper cup as measured at its inner surface. This construction provides an annular space into which the inner and outer wall portions of the diaphragm extend, so the diaphragm partially surrounds the actuator.

*Operation—Embodiments of FIGS. 1 and 2*

During normal operation the various elements of pressure responsive actuator 1 occupy the positions shown in FIG. 1. As shown, there is a space between top edge 24 of diaphragm 3 and end wall 8 of cup 5. During normal operation variations of pressure in chamber 35 cause bellows 2 to distort axially. Since corrugated side wall 17 of the bellows is of springy material a spring force is present which normally returns the bellows to an original position. Since the effective area of the bellows is the same as the effective area of the diaphragm, chamber 33 remains completely filled during movement of actuator member 4 by displacement of the bellows. Due to this arrangement of elements pressure responsive actuator 1 is linearly responsive to variations of pressure in chamber 35 and a certain displacement of end wall 18 of the bellows results in an identical displacement of actuator member 4. Such characteristic movement can be best seen by reference to FIG. 7 wherein line B shows the relative motion characteristics between actuator member 4 and bellows 2.

In FIG. 2, the positions of the various elements are shown when overpressure in chamber 35 is encountered. As shown, bellows 2 is susbtantially compressed, diaphragm 3 is distorted into engagement with the cooperating wall portions of actuator member 4 and the inner surfaces of cup 5. When the bellows is compressed to the extent shown in FIG. 2 further distortion of the bellows and further movement of actuator member 4 is effectively prevented. Such prevention of further movement results from the coaction of two features: first the mechanical connection at 23 between actuator member 4 and flat end 8 of the bellows which assures like displacement of those elements, and second an actuator having a body portion 20 of smaller area measured in a direction perpendicular to its direction of motion than the effective area of bellows 2. As pressure in the chamber 35 increases with the actuator elements in the FIG. 2 position bellows 2 attempts to displace additional incompressible fluid 34. Assume that bellows 2 distorts slightly axially and flat end 8 moves a very slight amount. Actuator 4 can move only the same distance because of the mechanical connection at 23. However, body 20 has a smaller area than the effective area of bellows 2. Therefore, the amount of fluid displaced by bellows 2 during such very slight distortion is substantially greater than the volume of fluid which the same motion of actuator 4 can accommodate. Therefore, pressure in enclosure 33 rises rapidly and creates a pressure balance across the bellows. If the effective area of actuator 4 is equal to or greater than the effective area of bellows 2 further distortion of the bellows can take place and the desired pressure balance will not be realized. Hence, damage to bellows 2 would invariably result. Because of the arrangement of elements, the mechanical connection between actuator 4 and bellows 2 functions to limit the motion of actuator 4.

FIG. 8 shows the relationship between pressure in enclosure 33 and chamber 35. The portion of the curve designated D represents pressure within the normal working limits of the pressure responsive actuator. The portion of the curve designated E shows the very rapid rise of pressure in enclosure 33 as pressure of working fluid in chamber 35 attempts to compress fluid 34. When pressure in enclosure 33 equals pressure in chamber 35 any further increase of pressure in chamber 35 causes an equal pressure increase in enclosure 33, as shown by the portion of the curve designated F. Since the pressures are balanced on each side of bellows 2 it is apparent that there will be no damage to the bellows unless some other portion of the pressure responsive actuator fails.

*Operation—Embodiments of FIGS. 3–6*

Referring to curves A, B and C of FIG. 7 it is readily apparent that displacement of the actuator member is linear in response to the distortion of the bellows. Pressure responsive actuator 51 (embodiment of FIGS. 3 and 4) is seen at line B to have the same motion characteristics as pressure responsive actuator 1 (FIGS. 1 and 2). The reason for such like characteristics is that the effective area of the diaphragm is the same as the effective area of the bellows of both of these pressure responsive actuators.

In the FIG. 5 embodiment where the effective area of bellows 102 is substantially larger than the effective area of diaphragm 103, there is substantially greater displacement of actuator 104 for a given distortion or displacement of bellows 102. Such characteristics is best comprehended by reference to curve A of FIG. 7.

In the FIG. 6 embodiment in which the effective area of bellows 152 is substantially smaller than the effective area of diaphragm 153 it is seen with reference to curve C of FIG. 7, that a certain displacement of bellows 152 causes a much smaller displacement of actuator member 154.

The overpressure protection operation is identical for the embodiments of FIGS. 3 through 6. For each embodiment normal working pressure in the chamber surrounding the bellows causes motion of the actuator member within its predetermined limits. When overpressure is encountered the stop washer on the body of the actuator member engages the end wall of the upper cup and further movement of the actuator member is thus prevented. Thereafter, any increase in pressure in the chamber surrounding the bellows merely increases the pressure of the incompressible fluid until these pressures are equal. The relationship of the pressures on each side of the bellows is as shown in FIG. 8 with D representing normal working pressure, E the rapid increase of pressure of the incompressible fluid at the limit of motion of the actuator, and F the effect of higher pressures after pressure on each side of the bellows is equal.

While a preferred embodiment has been shown and described it is to be understood that numerous variations and changes can be made in the preferred embodiments disclosed without departing from the scope of this invention.

What is claimed is:

1. In a pressure responsive actuator having overpressure protection for the flexible wall members thereof, the combination comprising:

an actuating member;

support means mounting said actuating member for bidirectional limited movement along a predetermined path;

first flexible wall means including a peripheral portion fixed to said support means, and a portion to which operating pressure is to be applied;

second flexible wall means having a central portion and a peripheral portion said central portion of said second flexible wall means being connected to said actuating member for movement therewith;

said peripheral portion of said second flexible wall means being carried by said support means;

said first and second flexible wall means coacting to define a fluid-tight chamber, said chamber being filled with an incompressible fluid;

application of operating pressure to said first flexible wall means causing conjoint movement of said first flexible wall means, and said actuating member in one direction along said path said second flexible wall means distorting, during such conjoint movement, to allow displacement of said incompressible fluid to accommodate the movement of said first flexible wall means; and retaining wall means forming a part of said pressure responsive actuator and engaged by said second flexible wall means, when the latter is distorted, to limit the amount of distortion to which said second flexible wall means can be subjected in response to movement of said first flexible wall means by operating pressure above a predetermined value;

whereby further movement and distortion of said first flexible wall means is prevented by said incompressible fluid, at operating pressure above said predetermined value, and damage to said first flexible wall means by such higher pressure is prevented.

2. A pressure responsive actuator in accordance with claim 1 in which said first flexible wall means is a bellows comprised of:
a corrugated side wall, and
an end wall;

said operating pressure to be applied to said first flexible wall means is from an operating fluid, and said bellows is formed of a material impervious to said operating fluid.

3. A pressure responsive actuator in accordance with claim 1 in which said second flexible wall means is a flexible diaphragm, and portions of said diaphragm normally extend around said actuating member.

4. A pressure responsive actuator in accordance with claim 1 in which said incompressible fluid is a low viscosity liquid.

5. A pressure responsive actuator in accordance with claim 1 in which:

said support means includes
a cup shaped member within which said second flexible wall means is distorted, and
an opening in the end wall of said cup shaped member; and said retaining wall means includes
a portion of said cup shaped member, and
a portion of said actuator.

6. A pressure responsive actuator in accordance with claim 1 in which:

said actuating member is mechanically connected to said central portion of said first flexible wall means to which operating pressure is to be applied.

7. A pressure responsive actuator in accordance with claim 1 in which:

the effective area of said first flexible wall means measured perpendicular to its direction of distortion is approximately the same as the effective area of said second flexible wall means measured perpendicular to its direction of distortion, and a certain force exerted on said first flexible wall means by said operating pressure causes said incompressible fluid to exert a like total force on said effective area of said second flexible wall means.

8. A pressure responsive actuator in accordance with claim 1 in which the effective area of said first flexible wall means measured perpendicular to its direction of distortion is smaller than the effective area of said second flexible wall means measured perpendicular to its direction of distortion; and a certain force exerted on said first flexible wall means by said operating pressure causes said incompressible fluid to exert a greater total force on said effective area of said second flexible wall means;

whereby said pressure responsive actuator functions as a force multiplier.

9. A pressure responsive actuator in accordance with claim 1 in which the effective area of said first flexible wall means measured perpendicular to its direction of distortion is greater than the effective area of said second flexible wall means measured perpendicular to its direction of distortion; and a certain force exerted on said first flexible wall means by said operating pressure causes said incompressible fluid to exert a smaller total force on said effective area of said second flexible wall means;

whereby said pressure responsive actuator functions as a motion multiplier.

10. In an actuator of the type described, the combination of an actuating member;

support means mounting said actuating member for bidirectional limited rectilinear movement along a predetermined path relative to said support means;

first flexible wall means including
a peripheral portion fixed to said support means, and
a central portion to which operating pressure is to be applied;
said flexible wall means being disposed with said central portion thereof centered on and transverse to said predetermined path of said actuating member;

second flexible wall means having a central portion and a peripheral portion,
said central portion of said second flexible wall means being connected to said actuating member for movement therewith,
said peripheral portion of said second flexible wall means being fixed to said support means;

said first and second flexible wall means coacting to define a fluid-tight chamber, said chamber being filled with an incompressible fluid;

applicaiton of operating pressure to said central portion of said first flexible wall means in one direction along said path causing conjoint movement of said actuating member and such central portion in said one direction,
said second flexible wall means distorting, during such conjoint movement, to allow displacement of said fluid to accommodate the movement of said first flexible wall means;

retaining wall means including:
portions of said support means, and
portions of said actuating member said retaining wall means being engaged with said second flexible wall means, when the latter is distorted:
to limit the amount of distortion to which said second flexible wall means can be subjected, and
to limit the amount of distortion to which said first flexible wall means can be subjected by virtue of the effect of said incompressible fluid, and means to limit the travel of said actuating member in said one direction.

11. An actuator in accordance with claim 10 in which
said support means has a generally circular opening at one end, the center of the opening being aligned with the axis of said predetermined path of said actuating member; and
said actuating member has a cylindrical portion extending through said opening, said cylindrical portion having a diameter only slightly smaller than said opening to prevent distortion of said second flexible wall means into the annular space between said cylindrical portion and said opening.

12. An actuator in accordance with claim 10 in which the retaining wall means formed by said portions of said support means are imperforate and surround said second flexible wall means.

13. An actuator in accordance with claim 10 in which said means to limit the travel of said actuating member comprises a mechanical connection between said actuating member and the central portion of said first flexible wall means.

14. An actuator in accordance with claim 10 in which said means to limit the travel of said actuating member comprises a stop element carried by said actuating member and engageable with said support means at the limit of travel of said actuating member.

References Cited by the Examiner

UNITED STATES PATENTS

| | | | |
|---|---|---|---|
| 2,554,659 | 5/51 | Branson | 92—43 |
| 2,928,425 | 3/60 | Miller | 92—38 X |

JULIUS E. WEST, *Primary Examiner.*